Patented May 5, 1931

1,803,634

UNITED STATES PATENT OFFICE

HARRY J. MORGAN, OF WALNUT PARK, CALIFORNIA, ASSIGNOR TO P. L. & M. COMPANY, OF LOS ANGELES, CALIFORNIA, A CORPORATION OF CALIFORNIA

WELDING COMPOSITION

No Drawing.    Application filed August 14, 1928. Serial No. 299,636.

This invention relates generally to methods of applying hard facing material to the surfaces of metallic bodies by electrical welding and to compositions which can be employed in such methods.

It is an object of this invention to devise a method of electrical welding for directly applying and alloying ingredients upon the surface of a metal body to form a hard facing.

It is a further object of this invention to devise a composition which will facilitate forming a hard alloy facing upon a metal body.

It is a further object of this invention to devise a composition useful in electrical welding, which makes use of relatively hard unwrought metal such as tungsten.

Further objects of the invention will appear from the following description in which I have set forth the preferred embodiment of my invention. It is to be understood that the appended claims are to be accorded a range of equivalents consistent with the state of the prior art.

In my copending application No. 286,725 entitled Welding process and product, I have disclosed a novel method of applying hard facing material to a metal body by electrical welding. A facing of this character is frequently a necessity in the manufacture or repair of certain articles, as for example earth boring drills having cutting edges which are subjected to severe wear. This application is a continuation in part of the subject matter of that application, and I have also herein disclosed a composition in convenient form which contains certain ingredients for forming an alloy facing of the desired character when fused by an electric arc.

One material which I have employed with good results, and which preferably forms the principal ingredient of my composition, is the element tungsten. Tungsten is generally available in unwrought condition and is a steel gray to black powder having a fusion point of about 3200° centigrade. When this element is alloyed with other elements, tungsten hardening in nature, as for example carbon, it forms an extremely hard metallic material which will resist wear and abrasion and is particularly adapted to form the cutting edges of drills or bits. While it is possible to utilize unwrought tungsten in my method in a number of different forms as for example in the form of welding rods as described in copending application No. 286,725, I have found that it is preferable for many purposes to utilize a granular composition containing the ingredients required, and which can be spread over the surface upon which a facing is to be formed.

As one example of a composition with which I have secured good results, I take about nine pounds of powdered unwrought tungsten and one pound of finely divided carbon, together with a suitable binder, such as one ounce of dextrine. These ingredients are thoroughly mixed while in dry condition and moisture, as for example dextrine water, is added to form a paste. Care should be taken to prevent settling of the tungsten by the addition of too much moisture. The paste is then dried and baked in a suitable oven to form a solid mass, which is broken into small particles, preferably sufficiently small to pass a $\frac{1}{4}''$ screen but too large to pass a 60 mesh screen. This divided or granular material can be packed in suitable cartons for sale.

When it is desired to utilize the composition described above for applying a hard facing to the surface of a metal body, the granular material is spread upon the surface of the body, and is fused by an electric arc formed between the body and a welding electrode. The tungsten alloys with the carbon to form a tungsten carbide and also alloys with a certain amount of the material of the metal body. A certain percentage of the carbon is burned during the welding process, thus serving as a reducing medium to prevent oxidation of the tungsten. After the first layer has been applied, I preferably apply a plurality of succeeding layers as described in application 286,725, in order that the last layer may contain a less amount of the material of the metal body, and thus afford a surface of extreme hardness.

It is apparent that the principles of this invention are applicable to a variety of ingredients, as other elements capable of forming hard alloys can be used in addition to or as a substitute for tungsten. Furthermore other ingredients may be used in addition to or substituted for the carbon. As examples of other ingredients which may be utilized reference is made to elements such as nickel, uranium, molybdenum, manganese, vanadium, titanium, chromium, tantalum or like elements which are capable of producing hard alloy facings. It is also to be noted that the percentages of the ingredients employed may be varied within the scope of this invention. Where the composition utilizes tungsten and carbon as in the preferred embodiment of this invention, I prefer that tungsten be the principal ingredient of the composition and that the percentage of this element be sufficient to provide a facing alloy having at least 45% of tungsten.

It is one feature of my invention that the method makes possible the utilization of elements in unwrought condition, such as powdered tungsten. This element is directly formed into wrought condition during the welding process, rather than as a separate preliminary step.

I claim:

1. A composition for use in applying a hard metal facing to a metallic body by heat welding, said composition comprising a mixture of a material like tungsten in the ability of tungsten to form a hard metal when combined with a hardening element like carbon, the material and the hardening element being finely divided and in suitable proportions to give a hard metal when fused, as exemplified by the proportions of approximately nine pounds of tungsten and one pound of carbon, the material and the hardening element being bound together by a binder to form substantially homogeneous granules.

2. A composition for use in applying a hard metal facing to a metallic body by heat welding, the composition comprising finely divided tungsten and finely divided carbon bound together into substantially homogeneous granules by a binder, the tungsten and carbon being in such proportions that a hard metal results upon fusion, as exemplified by the proportions of nine pounds of tungsten and one pound of carbon.

3. A composition for use in applying a hard metal facing to a metallic body by heat welding, the composition comprising a mixture of approximately nine pounds of finely divided tungsten and one pound of finely divided carbon, the finely divided tungsten and carbon being bound together into substantially homogeneous granules by a binder.

4. A composition for use in applying metal to a metallic body by heat welding comprising a mixture of a material capable of giving a hard facing like tungsten and a tungsten hardening element, said material and said element being bound together by a binder to form substantially homogeneous granules.

5. A composition for use in applying metal to a metallic body by heat welding comprising a mixture of a tungsten like material and a hardening element, the material and the element being in a relatively finely divided form bound together by a binder into substantially homogeneous granules, the tungsten like material comprising the major portion of the mixture.

6. A composition for use in applying metal to a metallic body by heat welding comprising a homogeneous mixture of tungsten and carbon particles in which tungsten is the major constituent, said mixture being bound together to form relatively large granules compared to the size of the tungsten particles.

In testimony whereof, I have hereunto set my hand.

HARRY J. MORGAN.